United States Patent [19]
Austin et al.

[11] Patent Number: 5,564,841
[45] Date of Patent: Oct. 15, 1996

[54] SYSTEM AND METHOD FOR DYNAMIC ADJUSTMENT OF BAR CODE PRINTER PARAMETERS

[75] Inventors: Pixie A. Austin, Everett; Duane M. Fox, Snohomish, both of Wash.

[73] Assignee: Intermec Corporation, Everett, Wash.

[21] Appl. No.: 305,393

[22] Filed: Sep. 13, 1994

[51] Int. Cl.$^6$ ........................................... B41J 2/36
[52] U.S. Cl. .................................. 400/103; 400/74
[58] Field of Search .......................... 400/74, 103, 61, 400/62, 63, 76, 120.01

[56] References Cited

U.S. PATENT DOCUMENTS 4,699,531  10/1987  Ulinski, Sr. et al. ............... 400/74

FOREIGN PATENT DOCUMENTS 74653   4/1988  Japan ............................... 400/120
197672  8/1988  Japan ............................... 400/73

Primary Examiner—Edgar S. Burr
Assistant Examiner—Steven S. Kelley
Attorney, Agent, or Firm—Seed and Berry LLP

[57] ABSTRACT

A system and method for dynamically adjusting operating parameters of a printer using bar code images to achieve optimal print quality. A reader operates in conjunction with a bar code printer and scans the output images printed by the printer. A verifier analyzes the scanned image to determine the quality of the output image. The system adjusts printer operating parameters, such as print speed, print head pressure, and burn duration to optimize the quality of the output image for a selected quality grade of output image. Adjustments are made in a closed-loop fashion without the need for user intervention.

24 Claims, 5 Drawing Sheets

SYSTEM AND METHOD FOR DYNAMIC ADJUSTMENT OF BAR CODE PRINTER PARAMETERS

TECHNICAL FIELD

The present invention relates generally to a system for printing symbologies such as bar codes and, more specifically, to a system and method for the dynamic adjustment of printer parameters for optimal print quality.

BACKGROUND OF THE INVENTION

Electronic printers, such as thermal printers, laser printers, and ink-jet printers, are used to print on a wide range of print media in a variety of applications. For example, printers are typically used as output devices for personal computers. Another important application of printers is in the printing of symbologies such as bar codes.

Depending upon the specific application, a variety of print media may be used in bar code printers. For labeling of products in inventory applications, for example, bar codes are often printed onto label stock of varying thicknesses and surface textures. The particular type of print medium can significantly affect the quality of print achievable by a printer and can also affect the selection of operating parameters of the printer.

In certain applications, the selection of printer operating parameters may also be affected by the type of image being printed. For example, there are a range of quality levels that can be selected for a bar code image. The American National Standards Institute (ANSI) defines the quality of bar code image in ANSI standard Guidelines For Bar Code Print Quality, developed by committee X3A1.3 and MH10.8. The ANSI quality grades are letter grades that include A, B, C, D, and F where A is the highest grade and F is a failing grade. A bar code image having a quality grade of A must have certain defined characteristics, while a lower quality bar code image having a quality grade of C must meet less stringent standards. The quality of the bar code image can be controlled by the proper selection of the print medium and the proper selection of printer operating parameters to be used when printing on that print medium, such as print speed, print head pressure, and burn time. Burn time is the length of time that a printing element in a thermal print head is energized to cause a portion of the output image to appear on the print media.

In most prior art printers, the printer operating parameters are selected and manually entered by the user for the particular printer and the particular print medium selected for use, often on a trial and error basis. The user typically chooses the printer operating parameters by entering information using buttons on the printer. This process is slow and tedious. Such printers generally have limited user interface capability, and printer operating parameter selection is accomplished by selecting menus and selecting parameters within these menus. The user must have an extensive experience in the operation of the particular printer, as well as experience in selecting the printer operating parameters for the selected print medium.

Many times printers are coupled to a host computer using a computer interface, such as an RS-232 interface. The host computer downloads the printer operating parameters rather than the user manually entering the parameters through a menu on the printer itself. This is sometimes accomplished with a label design software package. While the user interface in such printing system may be more sophisticated, the user must still have experience in the use of the printer and host computer, as well as experience in selecting the appropriate printer operating parameters for the selected print medium.

After a period of trial and error in selecting the appropriate printer operating parameters, the printer should print bar codes with an acceptable quality level. However, changes in operating conditions, such as a change in the ambient temperature or a change in temperature at the print head, may change the quality of the output image and result in an unacceptable image. A bar code verifier, well known in the art, can be used to scan and analyze the output image to provide an ANSI grade for the particular image. To compensate for changes in the quality of the output image, the user must manually alter the printer operating parameters or alter them using the RS-232 interface described above. The alteration of printer operating parameters to compensate for changes in operating conditions also requires a great deal of experience to correctly determine which operating parameters should be adjusted and how much they should be adjusted.

When another type of print medium is selected for the next print job, the entire process must be repeated for the new print medium. Prior art printers do not provide a simple technique for changing primer operating parameters to accommodate changes in print media or for altering the printer operating parameters to compensate for changes in operating conditions. For good quality results in reasonable time the user must have extensive knowledge of the particular printer being used, the type of print media to be used with the particular printer, and a knowledge of the operating system if a host computer is used to control the selection of printer operating parameters.

A typical prior art printing system is illustrated in FIG. 1. A host computer 2 controls the operation of both a bar code printer 4 and a bar code reader 6. The printer 4 and the reader 6 are separate devices that are independently coupled to the host computer 2. The printer 4 is coupled to the host computer 2 through a printer interface 8. A printer power supply 10 provides the necessary electrical power to the printer interface 8 and a print engine 12. The print engine 12 is the portion of the printer 4 that actually produces the output image on the print medium. Many different types of print engines 12 can be used with the printer 4.

The reader 6 is coupled to the host computer 2 through a reader interface 14. A reader power supply 16 provides the necessary electrical power to the reader interface 14 and a scan engine 18. The scan engine 18 can be used to scan the output image of the print medium and read or decode the information encoded in the output image. The host computer 2 controls the operation of the printer 4 and the reader 6. There is no direct communication between the printer 4 and the reader 6. In other prior art systems, the printer 4 and the reader 6 are standalone devices that do not utilize or require the host computer 2. The standalone printer and the standalone reader do not communicate with each other and have no interactive capabilities. To verify the quality of an output image, with a prior art system, the user must manually take the print medium with the output image to the verifier to verify the quality level of the output image as discussed above. The verifier may be a standalone device or may be integrated with the host computer 2, using the reader 6 to scan the output image. However, the user must still adjust the printer operating parameters in the manner described above if the output image cannot be read or does not meet the desired level of quality.

The extensive knowledge of the printer and print media required of a user by the prior art, together with the tedious process of manually selecting or adjusting printer operating parameters, make it difficult to switch from one type of print medium to another, or to adjust the operating parameters to compensate for changes in printer operating conditions. Therefore, it can be appreciated that there is a significant need for a printing system that simplifies the selection of printer operating parameters and maintains the desired quality level of the output image.

SUMMARY OF THE INVENTION

The present invention is embodied in a system for printing on a selected print medium, the system comprising a housing having a print medium path along which the selected print medium travels, a printer within the housing to generate an output image using printer operating parameters, and a reader positioned along the print medium path to detect at least a portion of the output image after being generated by the printer, with the reader producing a digital representation of the detected portion of the output image. A verifier decodes the digital representation produced by the reader and determines therefrom a quality characteristic of the detected portion of the output image based on the decoded digital representation.

The system may further include alteration means for altering without intervention by the user at least one of the printer operating parameters if the quality characteristic is below an unacceptable quality level. The reader may detect the detected portion of every output image generated by the printer. Alternatively, the reader may detect the detected portion of the output image for a predetermined number of output images less than the total number of output images generated during a predetermined period of time.

In a system having adjustable printer operating parameters comprising a time period during which the output image is printed, a print speed at which the selected print medium passes along the print medium path, and a head pressure at which a print head in the printer presses against the selected print medium, alteration means are included to vary at least one of the adjustable printer operating parameters to control the quality characteristic.

In one embodiment, the system is adapted for use with a host computer and includes an interface port coupled to the printer and the reader, and connectable to the host computer. The verifier sends the quality characteristic to the host computer to permit the host computer to monitor the quality characteristic. The host computer may determine statistics relating to the quality characteristic and track performance of the printer based on the quality characteristic statistics and the desired quality specified by the user. In a system having alterable printer operating parameters, the system may further include alteration means within the host computer for altering at least one of the printer operating parameters if the quality characteristic is below an unacceptable level.

In another embodiment, the system may include a user input device to permit user selection of a print quality grade for the output image with the printer generating an output image to correspond to the user's selected print quality grade. In one embodiment, the print quality grade is an ANSI standard. In a system wherein the quality characteristic has a predetermined value, the verifier may generate an error detection signal when the quality characteristic value varies from the predetermined value by a predetermined amount.

DETAILED DESCRIPTION OF THE INVENTION

The present invention integrates the functionality of a bar code printer and bar code reader and verifier into a single unit. The integrated system simplifies operation with a host computer because only a single interface is required. Only one address is required if the integrated system is used on a network. Each type of print media can be affixed with a bar code label that contains all necessary information for printer operating parameters unique to the particular media. A relatively inexperienced user need only scan the parameter bar code using the integrated reader, and the system automatically adjusts the printer operating parameters for printing on the selected print media. Bar codes may also be used to enter other operating parameters simply by scanning the desired bar code using the integrated reader. A further advantage of the present invention is that the integrated system can scan the output image and dynamically adjust the printer operating parameters to optimize the output image to the desired quality level.

Figure 2A:
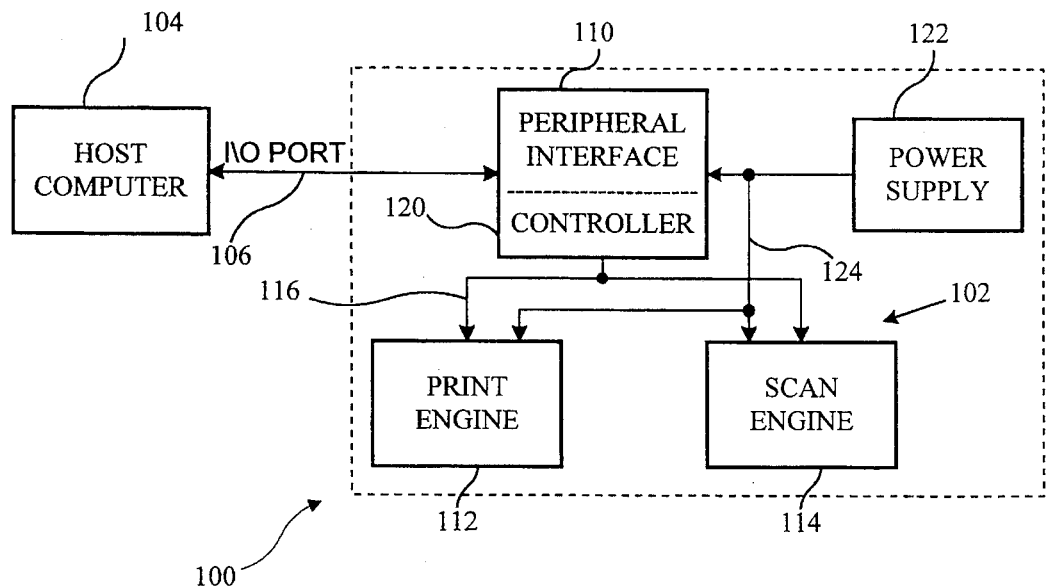
FIG. 2A is a functional block diagram of a printing system according to the present invention.

The present invention is embodied in a printing system 100, shown in the functional block diagram of FIG. 2A. An integrated printer/reader 102 is coupled to a host computer 104 by a standard I/O port 106 such as an RS-232 port, an RS-432 port, a parallel port, a network connection, or the like. The present invention is not limited by the specific form of the I/O port 106 coupling together the host computer 104 and the integrated printer/reader 102.

Within the integrated printer/reader 102 is a peripheral interface 110 that controls the operation of the integrated printer/reader. The peripheral interface 110 controls communications with the host computer 104, and also controls the operation of a print engine 112 and a scan engine 114 which comprise components of the integrated printer/reader 102. The term "print engine" as used herein refers to any device capable of transferring data from an electronic form to some form of print media to generate an output image. The print engine 112 includes conventional electromechanical components (not shown) that cause the print medium to move through the print engine. The print engine 112 also includes a conventional print head (not shown) that is energized to transfer the data from the electronic form to the print medium. The print engine 112 may be thermal, laser, ink-jet, impact, or the like. Similarly, the term "scan engine" as used herein, refers to any device capable of converting a printed output image to data in an electronic form. The scan engine 114 may be a laser, vidicon, charge-coupled device, or the like. The present invention is not limited by the specific form of the print engine 112 or the scan engine 114, nor is it limited by the specific form of the print media.

Figure 1:
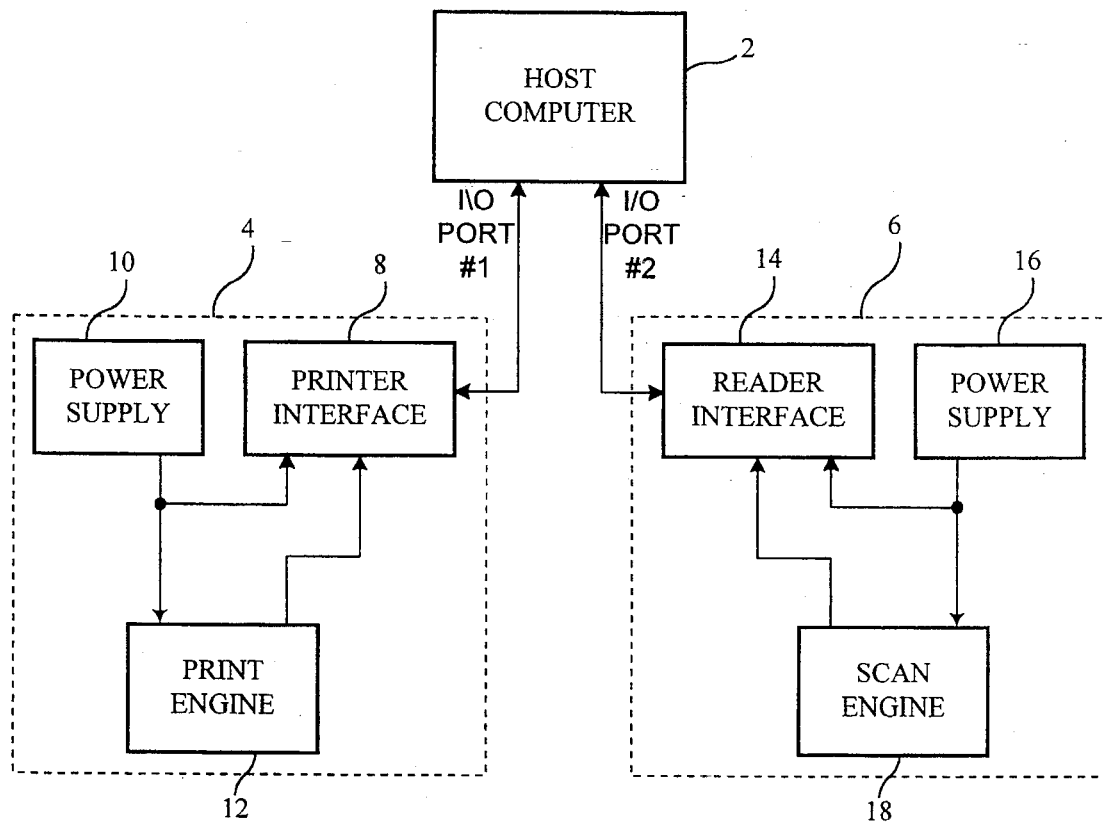
FIG. 1 illustrates a typical prior art priming system.

The print engine 112 and the scan engine 114 are coupled to the peripheral interface 110 by a signal bus 116. The signal bus 116 may carry both data signals and control signals. The operation of the signal bus 116 is well known in the art and will not be described herein. Unlike prior art systems, which require a host computer 2 (see FIG. 1) to control communications between a printer 4 and a reader 6, the integrated printer/reader 102 of the system 100 permits direct communication between the print engine 112 and the scan engine 114 without the intervention of the host computer 104.

A controller 120 within the peripheral interface 110 accepts commands from the host computer 104, parses the commands into a logical format, and relays appropriate commands to the print engine 112, the scan engine 114, or both. The controller 120 includes a microprocessor and memory (not shown). The operation of the controller 120 to process commands into a logical format is well known in the art and will not be described herein. A power supply 122 provides electrical power for the components of the integrated printer/reader 102 using a power bus 124. The integration of the printer and reader into a single system packaged as a unitary device eliminates the need for separate power supplies as required by the independent printer 4 and reader 6 of the prior art (see FIG. 1).

The host computer 104 may include a number of conventional peripheral devices such as a keyboard (not shown), a disk storage device (not shown), a video display terminal (not shown), and a line printer (not shown). The host computer 104 is illustrated in FIG. 2A as a separate device, such as a central computer that controls the operations of one or more system 100. The host computer 104 can monitor performance of the system 100, and provide command instructions to the system 100, as well as perform independent tasks such as tracking the production of a product, tracking inventory, or the like.

Figure 2B:
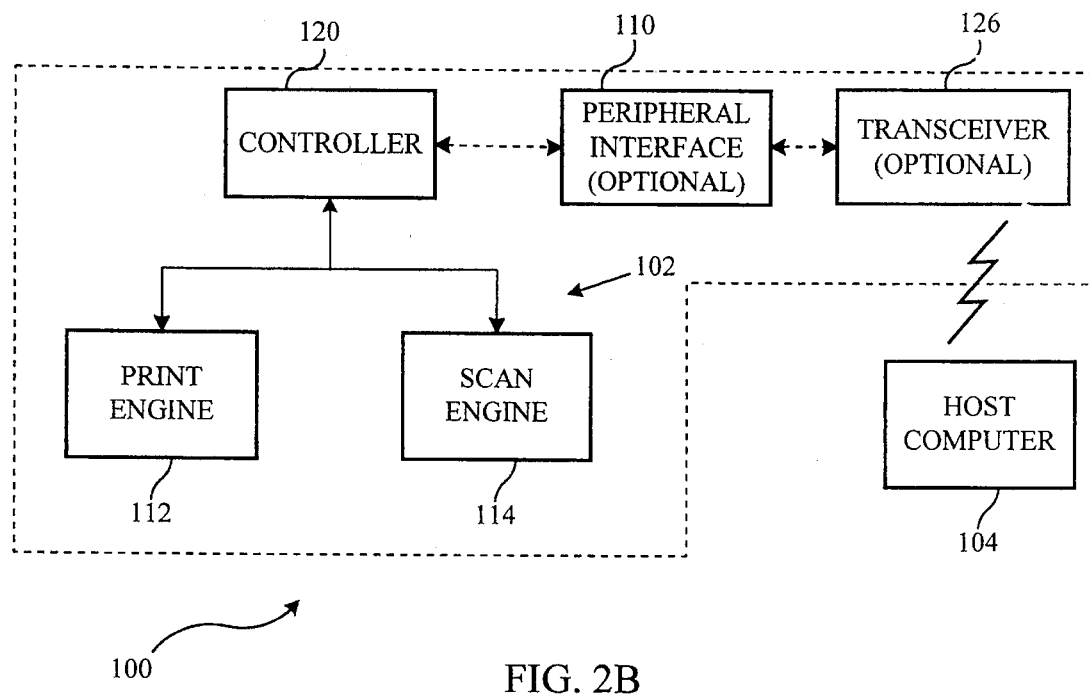
FIG. 2B is a functional block diagram of a portable version of the inventive system of FIG. 2A.

However, as will be appreciated by those of ordinary skill in the art, the microprocessor of the controller 120 with its computing power and the memory of the controller 120 function together as a computer and may be designed to operate without the host computer 104. If the controller 120 replaces the host computer 104, as shown in FIG. 2B, the system 100 can function as a standalone device. However, unlike prior art systems where the printer 4 and reader 6 cannot interact with each other (see FIG. 1), the system of the present invention permits the close interaction of the print engine 112 and the scan engine 114 because these two components are integrated together into a single system 100 packaged as a unit. It should be noted that some system components, such as the power supply 122, have been omitted from FIG. 2B for convenience.

The system 100 shown in FIG. 2B can still communicate with the host computer 104 through the peripheral interface 110 if it is desired to do so, thus making inclusion of the peripheral interface 110 in the system 100 optional. Thus, the host computer 104 can serve to track production, monitor performance of the system 100, and provide command instructions to the system 100. The system 100 of FIG. 2B is manufactured in a very small physical package so as to be portable. Such a portable integrated printer/reader 102 can be very useful in situations where portability is of great advantage to the user. For example, a large warehouse can store parts in large bins where bar code labels affixed to the bins identify the stored parts. Some warehouse arrangements have a plurality of identical preprinted bar code labels in an envelope at each bin to identify the parts in that particular bin. With a typical prior art system, the user takes one or more parts from a bin and one of the preprinted bar code labels. The user must then carry the preprinted bar code label to the reader 6 (see FIG. 1) to scan the preprinted label and identify the bin from which the parts were removed. The user must then enter a record of the quantity of parts taken so that the host computer 2 can properly track inventory. This is a cumbersome procedure that requires many steps for proper tracking of inventory. The preprinted labels stored with the parts may become mixed up, especially if the user is removing parts from more than one bin before traveling to the reader 6 to read the preprinted labels and enter the quantities of parts pulled. This cumbersome procedure often leads to errors in inventory, as well as reluctance on the part of the user to complete all the steps required to properly record the parts pulled and thus the resulting changes in inventory.

The portable system 100 of FIG. 2B overcomes these shortcomings by permitting the user to record changes in inventory at the location of the parts bins and eliminate the need for preprinted bar code labels. Each part bin has a preprinted bar code label permanently affixed thereto and the user simply scans the label with the scan engine 114 to identify the particular part bin. There are a number of different techniques by which the user can record the number of each part removed. For example, the user can scan the preprinted bar code label one time for each part removed from the part bin or scan a bar code sheet containing a plurality of preprinted bar codes and corresponding numbers to permit the user to scan the desired number of pulled parts using the scan engine 114. Alternatively, the portable system 100 can have a numeric keypad (not shown) to manually enter the number of parts removed from the bin.

In yet other inventory control systems, the preprinted label affixed to the parts bins also contains information about the number of parts that are in the bin. In such an inventory control system, the portable system 100 can be used to scan the preprinted label with the scan engine 114, as described above, to identify the particular part and quantity of parts being removed. However, the print engine 112 can also be used to print a new bar code label to be applied to the bin which contains the updated quantity information. In that manner, the bar code label on the bin will always contain information on the number of parts currently stored in the bin. Thus, the portable integrated printer/reader 102 greatly simplifies many tasks by permitting the user to carry the system 100 to the location where action must occur and by permitting communication between the scan engine 114 and the print engine 112.

The portable system 100 described above does not require the intervention of the host computer 104 to transfer data between the scan engine 114 and the print engine 112. However, the host computer 104 can still receive data from the system. In the inventory tracking example above, the host computer 104 can track the inventory in a variety of parts bins and determine when to order additional parts so as to optimize inventory control. Communication between the portable system 100 and the host computer is controlled by the peripheral interface 110 as previously described. However, the portable system 100 shown in FIG. 2B also includes an optional transceiver 126 to permit communications between the system and the host computer 104 when at a location remote from the host computer. The transceiver 126 can be a radio frequency device, an infrared device, or any other communication device. The present invention is not limited by the particular form of the transceiver 126. It should also be noted that some portable systems 100 may not require two-way communication between the system and the host computer 104. In such situations, the transceiver 126 may be replaced by a transmitter to only permit the transmission of data from the portable system 100 to the host computer 104. Thus, the portable system 100 can be easily used with the host computer 104 in a number of situations, such as inventory control where the portable system can be easily carried throughout a warehouse to read and/or bar code labels.

Figure 3A:
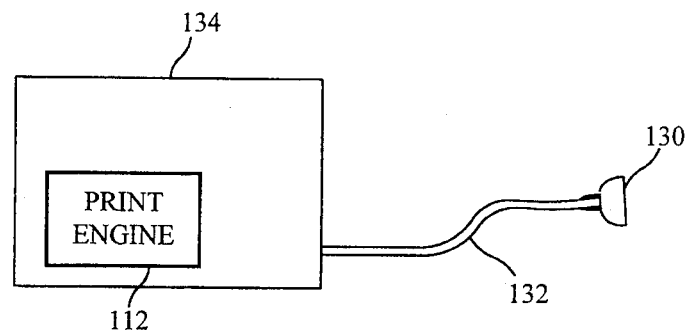
FIG. 3A illustrates one embodiment of the inventive system of FIG. 2A.
Figure 3B:
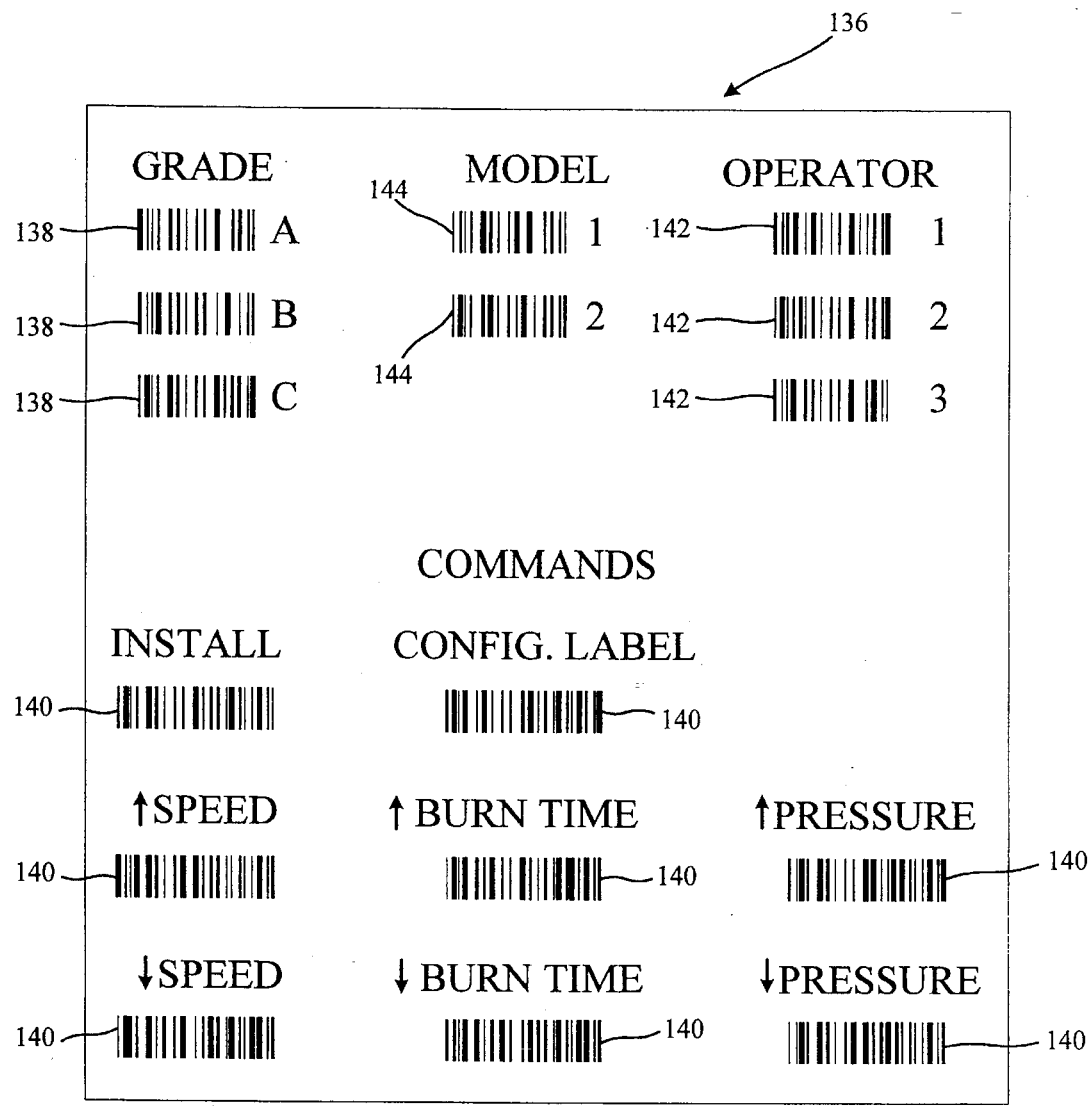
FIG. 3B illustrates a bar code command sheet used with the embodiment of FIG. 3A.

In another embodiment of the system 100, shown in FIG. 3A, the scan engine 114 includes a scanner 130 or scanning wand (not shown) attached by a cable 132 to a housing 134 that contains the print engine 112. The cable 132 may be a wire cable, a fiber optic cable or the like. The scanner 130 is functionally equivalent to the scan engine 114 (shown in FIG. 2A). The scanner 130 permits the user to scan bar code labels by passing the scanner over the bar code. With the scanner 130 as part of the integrated printer/reader 102, the user can monitor the quality of the output images, select printer operating parameters, or enter data into the system 100 of FIG. 3A. For example, a plurality of commands and operating parameters can be preprinted on a command page 136 as shown in FIG. 3B. In the example of FIG. 3B, the command sheet 136 contains bar codes 138 corresponding to a plurality of ANSI quality grades for the output image. The user can select the desired quality grade by simply scanning the corresponding quality grade bar code 138. The system 100 of FIG. 3A generates commands to the print engine 112 to produce the output image with the quality grade of the quality grade bar code. The system automatically adjusts the printer operating parameters to achieve the selected ANSI quality grade for the output image. The process of adjusting the printer operating parameters will be described in detail below.

The user can also adjust printer operating parameters using the command sheet 136. For example, the command sheet 136 illustrated in FIG. 3B contains bar codes 140 which are used to adjust printer operating parameters such as prim speed, print head pressure, and burn time. The user adjusts the desired parameter by simply scanning the selected one of the bar codes 140 that corresponds to the desired parameter using the scanner 130. This procedure for adjustment of the printer operating parameters can be useful when performing maintenance operations on the system 100 because the user can adjust the parameter and then monitor the resulting changes in the output image produced by the print engine 112. The printer operating parameters shown in FIG. 3B also includes an INSTALL bar code 140. The INSTALL bar code 140 is used to change the printer operating parameters whenever the print medium used with the print engine 112 is changed. The operation of the INSTALL bar code 140 will be described in detail below.

In addition to generating commands to control the quality of the output image, the system 100 can use the scanner 130 to enter other data. For example, the command sheet 136 also contains identification bar codes 142, in the form of operator identification numbers, and product identification bar codes 144, in the form of model numbers. The operator number is used to identify an individual performing a function such as a product inspector. The operator can "log on" to the system 100 by scanning the appropriate identification bar code 142. A password may also be used to authenticate the identity of the operator. The operator can identify the particular product under inspection by scanning the appropriate product identification bar code 144. When a particular product passes inspection, the operator can scan another bar code that generates commands to cause the print engine 112 (see FIG. 2A or 2B) to print a bar code label identifying the product model number, serial number, and inspector number. The label may be attached to the product to identify it. The system 100 may also use the bar codes scanned by the operator using the scanner 130 to report status data to the host computer 104 (see FIGS. 2A or 2B). The host computer 104 can track the production process and the efficiency of production using the data generated by the integrated printer/scanner 102.

In addition to command and printer operating parameter selection, the user can even use the scanner 130 to scan the output image generated by the print engine 112 to determine if the output image has characteristics corresponding to the selected quality output grade. Thus, the integrated printer/reader 102 permits the user to operate the print engine 112 to print labels, enter commands to adjust the printer operating parameters to control the print quality, monitor the quality of the output image printed by the print engine, track production, and change print media without using the tedious menu selection process of the prior art. With the present invention, many of these operations can be performed by a user with limited training and without the direct intervention of the host computer 104 to control all communication between the print engine 112 and the scan engine 114.

Figure 4:
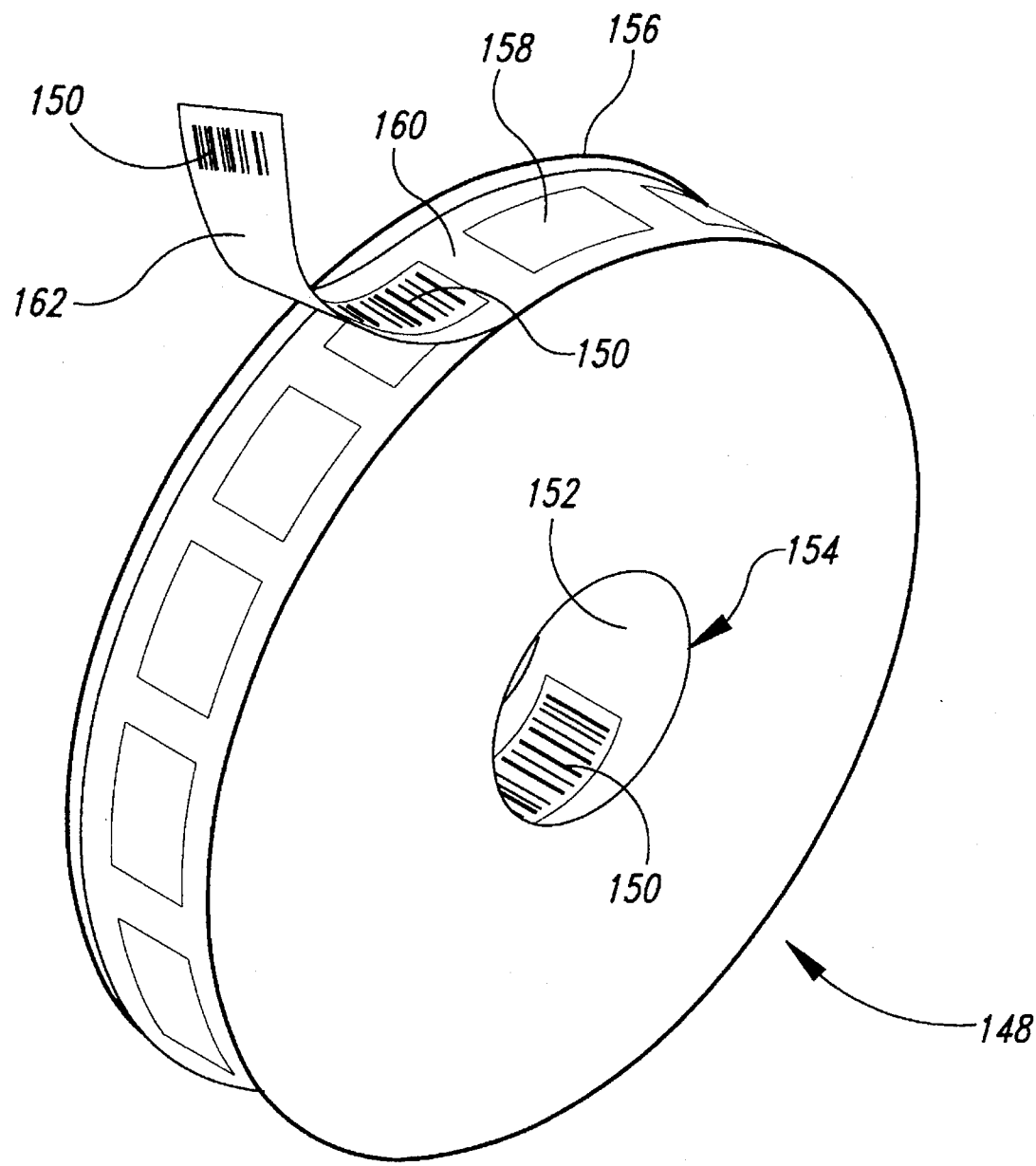
FIG. 4 illustrates an embodiment of the printer operating parameter information encoded for a specific print medium used with the inventive system of FIG. 2A.

As previously discussed, the printer operating parameters vary from one print medium to the next. This makes it tedious and burdensome for the user to switch from one type of print media to another. In another aspect of the present invention, the printer operating parameters associated with a particular type of print media are encoded in a bar code and attached to the print media itself. The printer operating parameters may be scanned using the scanner 130 (see FIG. 3A) or some other form of the scan engine 114. A roll of print medium 148 is shown in FIG. 4 with a parameter bar code 150 attached to the free end thereof. The print medium 148 may have several parameter bar codes 150 to describe different printer operating parameters. For example, the sensitivity of the print medium, the print head pressure, the darkness level and identification of the print medium 148 as direct thermal or thermal transfer label stock or ribbon can be encoded in one or more parameter bar codes 150. The present values for the printer operating parameters can be printed by selecting the CONFIG. LABEL command 140 (see FIG. 3B), which causes the print engine 112 to print the current configuration. Thus, the system 100 can adjust printer operating parameters to configure the print engine 112 for the specific print medium 148. If the system 100 is coupled to the host computer 104 (see FIG. 2A), the host computer can select values for the printer operating parameters. The host computer 104 can select all printer operating parameters or simply select the printer operating parameters that vary from one type of print engine 112 to another.

The system 100 permits the user to scan the parameter bar code 150 when the roll of print medium 148 is first mounted for use by the print engine 112. Alternatively, the parameter bar code 150 can be at a different location on the roll of print medium 148, such as an inside portion 152 of a spool 154 around which the print medium is rolled. This permits a partially used roll of print medium 148 to be easily reinstalled after another type of print medium has been used for a time by the user simply scanning the parameter bar code 150 attached to the inside portion 152 of the spool 154 before mounting it in the print engine 112. In yet another alternative embodiment, the print medium 148 can comprise a support material 156 having printing surface 158 affixed to a first side 160 thereof. The parameter bar code 150 may be on the first side 160 of the support material 158 or on a second underside 162. The parameter bar code 150 may be printed on a label and affixed to the print medium 148 or printed directly on the print medium. The present invention is not limited by the particular form or location of the parameter bar code 150. The example of FIG. 4 shows a roll of print medium 148; however, the principles of the present invention apply equally to print media in any other form such as fan fold print media, stacked sheet print media, or the like.

The integrated printer/scanner 102 permits the user to change the print media without any intervention on the part of the host computer 104. However, it should be noted that the parameter bar code 150 can be used in the system 100 or in any prior art printing system and does not require the integrated printer/scanner 102 described above. If the system 100 is a standalone system (i.e., no host computer), the scan engine 114 (see FIG. 2A) or the scanning wand 130 (see FIG. 3A) can scan the parameter bar code 150 and use the information contained therein to select values for the printer operating parameters. When the host computer is used, the parameter bar code 150 can also contain information identifying the type of print media. This information can be relayed to the host computer 104 via the I/O port 106 (see FIG. 2A). The host computer can configure data for the print engine 112 so that the output image corresponds to the selected print media. For example, the parameter bar code 150 can contain information identifying the size of the labels. The host computer 104 configures the data so that the output image corresponds to the label size of the selected media.

Figure 5:
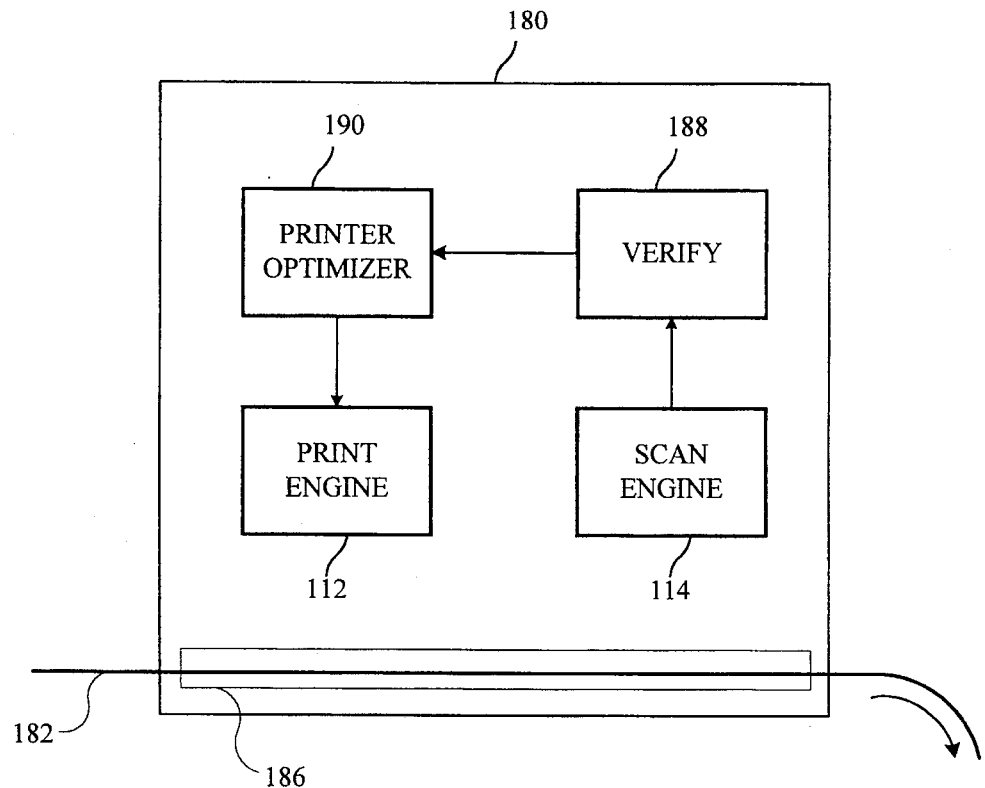
FIG. 5 illustrates an embodiment of the inventive system of FIG. 2A used to analyze output images after printing.

In yet another aspect of the present invention, the scan engine 114 may be physically mounted to automatically and without any action by the user scan the output image immediately after it is generated by the print engine 112. As shown in FIG. 5, the print engine 112 and the scan engine 114 are both mounted within a housing 180. A print medium 182 is routed along a print medium path 186 such that the print medium 182 sequentially passes first through the print engine 112 and then past the scan engine 114. The output image is placed on the print medium 182 by the print engine as the print medium passes along the print medium path 186. This output image is then scanned by the scan engine 114 as the print medium passes along the print medium path 186 past the scan engine. The scan engine 114 can be used to determine the quality of the output image and to dynamically adjust the print operating parameters so as to optimize the quality of the printed output images. In this embodiment, the scan engine 114 may be physically mounted fully within the same housing 180 as the print engine 112. Alternatively, the scan engine 114 may be mounted in an independent housing along the print medium path 186. In an alternative embodiment, the scanner 130 (see FIG. 3A) could be used to manually scan the output image and dynamically adjust the printer operating parameters.

The scan engine 114 generates electrical signals indicative of the output image. A verifier 188 (mounted within the housing 180) receives the electrical signals from the scan engine 114 and determines the quality of the output image. The operation of the verifier 188 is well known to those skilled in the art, and will not be described in detail herein. The verifier 188 can determine a number of parameters, such as the ANSI quality grade, previously discussed, or data indicating the output image contrast, bar width, bar spacing, modulation grade, decodability, or the like. The measurement of these parameters is described in the ANSI standards and is well understood by those of ordinary skill in the art. Because these terms are defined and described in the ANSI standards, they will not be described in detail herein. The verifier 188 generates an indicator of the image quality, and passes this information to a printer optimizer 190. The printer optimizer 190, in turn, adjusts the printer operating parameters to optimize the quality of the output image. For example, the output image may have a contrast level that is too low for the selected ANSI quality grade. The verifier 188 detects this condition and communicates it to the printer optimizer 90, and then the printer optimizer adjusts one or more printer operating parameters to increase the contrast in the output image.

The verifier 188 and printer optimizer 190 can dynamically adjust the printer operating parameters to optimize the quality of the output image. For example, the user can scan the parameter bar code 150 (see FIG. 4) for the roll of print medium 148 being used to initially select the printer operating parameters for that particular print medium. The user may also select the desired ANSI quality grade for the output image in a manner previously described. When the print engine 112 initially prints the output image on the print medium (see FIG. 3A), the scan engine 114 scans the output image, the verifier 188 analyzes the scanned output image, and the printer optimizer 190 adjusts the printer operating parameters to more closely achieve the desired ANSI quality grade for the output image printed. Thus, the present invention permits the user to easily select the desired print quality for any print medium, and automatically adjust the printer operating parameters to achieve the desired result as the print job progresses.

The present invention can also automatically adjust the printer operating parameters to compensate for changes in the print engine 112 or environmental changes such as ambient temperature changes. For example, the verifier 188 continuously scans the output images and the printer optimizer 190 dynamically adjusts the printer operating parameters as described above. This will compensate for changes in print quality resulting from changes in the ambient temperature, changes due to printhead wear, and the like. It should be noted that it is not necessary to scan every output image to verify the quality of the output image. Rather, the system can sample the output image and statistically determine the quality of the output images. A sample output image can be analyzed at predetermined periods of time, such as every five minutes, or at predetermined intervals, such as every tenth output image. The statistics used to determine how frequently a sample should be taken are well known in the art and will not be discussed herein.

The analysis of the verifier 188 can also be used to monitor the operation of the print engine 112. The host computer 104 (see FIG. 2A) can monitor the analysis data generated by the verifier 188 and determine whether the print engine 112 is operating within the desired range for any of the printer operating parameters. The host computer 104 can then determine whether the print engine 112 is operating satisfactorily or requires maintenance. For example, a sudden change of one or more of the printer operating parameters, such as the burn time, may indicate that the print head (not shown) is not operating properly. In this example, the verifier 188 may indicate that the quality of the output image is light even though the burn time is at its maximum setting. The host computer 104 can then determine whether the print engine 112 should be allowed to continue operation, or whether the print engine 112 should be stopped for repair. The host computer 104 can also provide a warning to the user that the print engine 112 is not operating within the desired range for a particular printer operating parameter.

Figure 6:
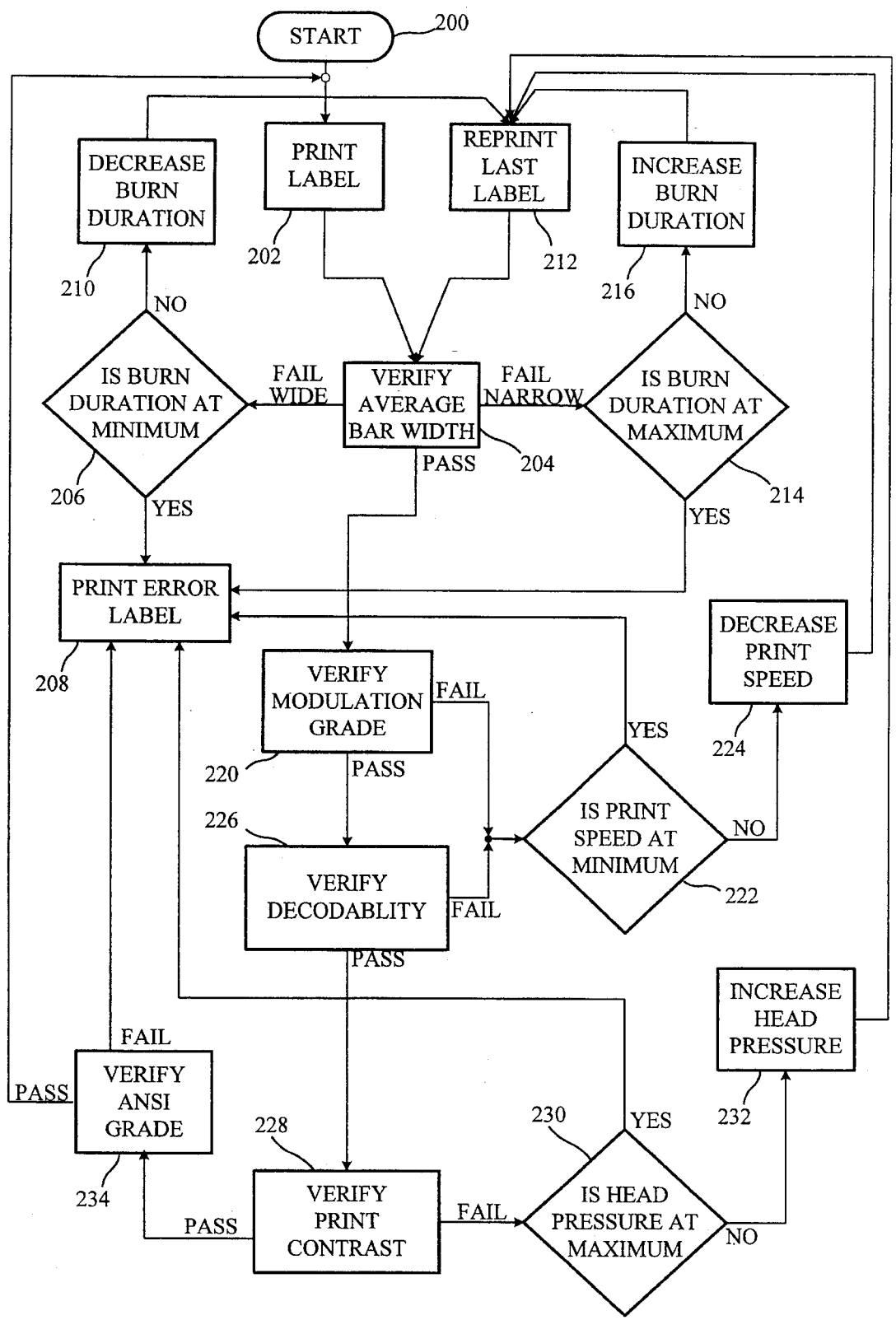
FIG. 6 is a flow chart illustrating the output image analysis procedure used by the inventive system of FIG. 5.

The operation of the verifier 188 and printer optimizer 190 is illustrated in the flow chart of FIG. 6. The system 100 begins operation at the start step 200. In step 202, the system 100 prints a label. In step 204, the verifier 188 verifies the average bar width of the output image. If the average bar width exceeds the specified range, the output image fails because it is too wide. In that event, the system 100 in decision 206 determines whether the burn duration is at the minimum duration setting.

If the burn duration is at minimum, the result of decision 206 is YES and the system 100, in step 208, prints an error label to indicate that the previous label does not meet specification. The error label indicates the nature of the failure, (i.e., average bar width is too wide and burn duration is at a minimum). This type of error reporting provides diagnostic information to the user to assist in determining the cause of the failure and quickly correcting the situation. If the burn duration is not at a minimum, the result of decision 206 is NO. In that event, the printer optimizer 190 decreases the burn duration in step 210 and reprints the previous label in step 212. Following step 212, the verifier 188 again verifies the average bar width in step 204. This loop will repeat until the average bar width is within tolerance or until the burn duration is at the minimum duration setting.

If the verifier 188 in step 204 determines that the average bar width is more narrow than the specified range, the output image fails because it is too narrow. In that event, the system in decision 214 determines whether the burn duration is at a maximum duration. If the burn duration is at a maximum, the result of decision 214 is YES, and the system prints an error label in step 208 to indicate that the previous label has unacceptably narrow bar width. As previously discussed, the error label indicates the nature of the failure, (i.e., average bar width is too narrow and burn duration is at maximum). If the burn duration is not a maximum, the result of decision 214 is NO. In that event, the printer optimizer 190 increases the burn duration in step 216 and returns to step 212 to reprint the last label. This loop will repeat until the average bar width is within tolerance or until the burn duration is at the maximum duration setting.

If the verifier 188 in step 204 determines that the bar width is within the acceptable range (i.e., within tolerance), the label passes the bar width verification step. In that event, the system 100 verifies the modulation grade in step 220. The modulation grade is a measure of the ratio of minimum edge contrast to symbol contrast and is defined by the ANSI standards. If the output image fails the modulation grade, the system 100, in decision 222, determines whether the print speed is at a minimum setting. If the print speed is at a minimum, the result of decision 222 is YES and the system 100 prints an error label in step 208 to indicate that the previous label does not have acceptable modulation characteristics. If the print speed is not at a minimum, the result of decision 222 is NO. In that event, the system 100 decreases the print speed in step 224 and returns to step 212 to reprint the last label.

In step 226, the system 100 verifies the decodability of the output image. Decodability is defined by the ANSI standards as the printing accuracy as would be perceived by a bar code reader using the symbology reference decode algorithm. In other words, it measures the ability of a bar code reader to correctly read the printed symbology or bar code output image. The system 100 compares the data generated by the scan engine 114 reading the output image with the data used to generate the output image to determine the accuracy of the printing by the print engine 112. Thus, the system 100 compares the scanned and decoded printed output image with the data used to generate the printed output image to determine if the output image was correctly decoded. If the output image fails the decodability verification, the system 100 returns to decision 222 to determine whether the print speed is at the minimum. As previously described, the system 100 will decrease the print speed in step 224 if possible, and reprint the previous label in step 212. If the print speed is already at the minimum, the system 100 prints an error label in step 208 to indicate that the previous label failed the decodability verification.

If the output image passes the decodability verification in step 226, the system 100 verifies the print contrast in step 228. If the output image fails the print contrast verification, the system 100 determines whether the head pressure is at a maximum level setting in decision 230. If the head pressure is at a maximum level, the result of decision 230 is YES and the system 100 prints an error label in step 208 to indicate that the previous label has unacceptable print contrast. If the head pressure is not at a maximum, the result of decision 230 is NO. In that event, the system 100 increases the head pressure in step 232 and returns to step 212 to reprint the previous label.

If the output image contrast is verified, the system 100 verifies the ANSI quality grade in step 234. As previously discussed, the desired ANSI quality grade is selected by the user. If the output image fails the ANSI quality grade verification, the system 100 prints an error label in step 208 to indicate that the previous output image has an unacceptable ANSI quality grade. If the output image has an acceptable ANSI quality grade, the output label is accepted and the system 100 returns to step 202 to print a new label. Thus, the system 100 can verify and dynamically adjust a number of printer operating parameters in order to optimize the quality of the output image being printed. As will be appreciated by those skilled in the art, the printer operating parameters illustrated in the flowchart of FIG. 6 are intended merely as examples of typical printer operating parameters that can be verified and adjusted. Other printer operating parameters, such as print head temperature, print head voltage, and the like, may also be adjusted by the printer optimizer 190 (see FIG. 5).

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for printing on a selected print medium, the system comprising:

a housing having a print medium path therein along which the selected print medium travels;

a printer within said housing and positioned along said print medium path to generate an output image on the selected print medium according to alterable printer operating parameters including a burn time operating parameter and a print speed operating parameter;

a stationary scan engine positioned along said print medium path to detect at least a portion of said output image on the selected medium after being generated by said printer, said scan engine producing a digital representation of said detected portion of said output image;

a verifier within said housing to decode said digital representation produced by said scan engine and to determine therefrom a quality characteristic of said detected portion of said output image based on said decoded digital representation; and a circuit automatically analyzing said quality characteristic and determining from a first aspect of said quality characteristic whether an adjustment to said burn time operating parameter will cause said quality characteristic to meet an acceptable quality level, said circuit automatically adjusting said burn time operating parameter for printing any unprinted portion of said output image and for printing thereafter if determined that adjustment of said burn time operating parameter will cause said quality characteristic to meet said acceptable quality level, said circuit further automatically analyzing said quality characteristic and determining from a second aspect of said quality characteristic whether an adjustment to said print speed operating parameter will cause said quality characteristic to meet said acceptable quality level, said circuit automatically adjusting said print speed operating parameter for printing any unprinted portion of said output image and for printing thereafter if determined that adjustment of said print speed operating parameter will cause said quality characteristic to meet said acceptable quality level.

2. The system of claim 1 wherein said alterable printer operating parameters also include a head pressure operating parameter to control a print head pressure at which a print head in said printer presses against the selected print medium, said circuit further automatically analyzing said quality characteristic and determining from a third aspect of said quality characteristic whether an adjustment to said head pressure operating parameter will cause said quality characteristic to meet said acceptable quality level, said circuit automatically adjusting said head pressure operating parameter for printing any unprinted portion of said output image and for printing thereafter if determined that adjustment of said head pressure operating parameter will cause said quality characteristic to meet said acceptable quality level.

3. The system of claim 1 wherein said scan engine detects said detected portion of every output image generated by said printer.

4. The system of claim 1 wherein said scan engine detects said detected portion of said output image generated by said printer for a predetermined number of output images less than the total number of said output images generated during a predetermined period of time.

5. The system of claim 1, further including a host computer, and wherein an interface port is coupled to said printer and said scan engine and connectable to said host computer, said verifier sending said quality characteristic to said host computer to permit said host computer to monitor said quality characteristic.

6. The system of claim 5 wherein said host computer determines statistics regarding said quality characteristic and tracks performance of said printer based on said quality characteristic statistics.

7. The system of claim 5 wherein said circuit analyzing said quality characteristic is within said host computer.

8. The system of claim 1, further including a user input device to permit user selection of a print quality grade for said output image, said printer generating said output image to correspond to said user selected print quality grade.

9. The system of claim 8 wherein said print quality grade is an ANSI standard.

10. The system of claim 8 wherein said printer operating parameters are alterable to control said quality characteristic, the system further including alteration means for altering at least one of said printer operating parameters if said quality characteristic is not equal to said user selected print quality grade.

11. The system of claim 1 wherein said quality characteristic has a predetermined value, said verifier generating an error detection signal when said quality characteristic value varies from said predetermined value by a predetermined amount.

12. A system for printing on a selected print medium, the system comprising:

a housing having a print medium path therein along which the selected print medium travels;

a printer within said housing and positioned along said print medium path to generate an output image on the selected print medium using alterable printer operating parameters including a burn time operating parameter and a print speed operating parameter;

a stationary scan engine positioned along said print medium path to capture a two-dimensional image of said output image on the selected medium after generated by said printer, said reader producing a digital representation of said captured image;

a verifier within said housing to decode said digital representation produced by said reader and to determine therefrom a quality characteristic of said detected portion based on said decoded digital representation; and a circuit to automatically analyze said quality characteristic and determine from a first aspect of said quality characteristic whether an adjustment to said burn time operating parameter will cause said quality characteristic to meet an acceptable quality level, said circuit automatically adjusting said burn time operating parameter for printing any unprinted portion of said output image and for printing thereafter if determined that adjustment of said burn time operating parameter will cause said quality characteristic to meet said acceptable quality level, said circuit further automatically analyzing said quality characteristic and determining from a second aspect of said quality characteristic whether an adjustment to said print speed operating parameter will cause said quality characteristic to meet said acceptable quality level, said circuit automatically adjusting said print speed operating parameter for printing any unprinted portion of said output image and for printing thereafter if determined that adjustment of said print speed operating parameter will cause said quality characteristic to meet said acceptable quality level.

13. The system of claim 12 wherein said alterable printer operating parameters also include a head pressure operating parameter to control a print head pressure at which a print head in said printer presses against the selected print medium, said circuit said circuit further automatically analyzing said quality characteristic and determining from a third aspect of said quality characteristic whether an adjustment to said head pressure operating parameter will cause said quality characteristic to meet said acceptable quality level, said circuit automatically adjusting said head pressure operating parameter for printing any unprinted portion of said output image and for printing thereafter if determined that adjustment of said head pressure operating parameter will cause said quality characteristic to meet said acceptable quality level.

14. A system for printing on a selected print medium, the system comprising:
   a printer to generate an output image on the selected print medium using alterable printer operating parameters including a burn time operating parameter and a print speed operating parameter;
   a stationary reader to detect at least a portion of said output image on the selected medium after generated by said printer, said reader producing a digital representation of said detected portion;
   a verifier to decode said digital representation produced by said reader and to determine therefrom a quality characteristic of said detected portion based on said decoded digital representation; and
   a circuit to automatically analyze said quality characteristic and determine from a first aspect of said quality characteristic whether an adjustment to said burn time operating parameter will cause said quality characteristic to meet an acceptable quality level, said circuit automatically adjusting said burn time operating parameter for printing any unprinted portion of said output image and for printing thereafter if determined that adjustment of said burn time operating parameter will cause said quality characteristic to meet said acceptable quality level, said circuit further automatically analyzing said quality characteristic and determining from a second aspect of said quality characteristic whether an adjustment to said print speed operating parameter will cause said quality characteristic to meet said acceptable quality level, said circuit automatically adjusting said print speed operating parameter for printing any unprinted portion of said output image and for printing thereafter if determined that adjustment of said print speed operating parameter will cause said quality characteristic to meet said acceptable quality level.

15. A method using a primer and a reader for printing on a selected print medium, the method comprising the steps of:
   generating an output image on the selected print medium using alterable printer operating parameters including a burn time operating parameter and a print speed operating parameter;
   detecting at least a portion of said output image on the selected medium after being generated by the printer using a stationary scan engine;
   producing a digital representation of said detected portion of said output image;
   decoding said digital representation produced to determine therefrom a quality characteristic of said detected portion of said output image based on said decoded digital representation;
   automatically adjusting said quality characteristic to determine from a first aspect of said quality characteristic whether an adjustment to said burn time operating parameter will cause said quality characteristic to meet an acceptable quality level;
   automatically adjusting said burn time operating parameter for printing any unprinted portion of said output image and for printing thereafter if determined that adjustment of said burn time operating parameter will cause said quality characteristic to meet said acceptable quality level;
   automatically analyzing said quality characteristic and determining from a second aspect of said quality characteristic whether an adjustment to said print speed operating parameter will cause said quality characteristic to meet said acceptable quality level; and
   automatically adjusting said print speed operating parameter for printing any unprinted portion of said output image and for printing thereafter if determined that adjustment of said print speed operating parameter will cause said quality characteristic to meet said acceptable quality level.

16. The method of claim 15 wherein said alterable printer operating parameters also include a head pressure controlling a print head pressure at which a print head in said printer presses against the selected print medium, the method further including the steps of automatically analyzing said quality characteristic and determining from a third aspect of said quality characteristic whether an adjustment to said head pressure operating parameter will cause said quality characteristic to meet said acceptable quality level, and automatically adjusting said head pressure operating parameter for printing any unprinted portion of said output image and for printing thereafter if determined that adjustment of said head pressure operating parameter will cause said quality characteristic to meet said acceptable quality level.

17. The method of claim 15 wherein the reader detects said detected portion of every output image generated by the printer.

18. The method of claim 15 wherein the reader detects said detected portion of said output image generated by the printer for a predetermined number of output images less than the total number of said output images generated during a predetermined period of time.

19. The method of claim 15 for use with a host computer having an interface port coupled to the printer and the reader and connectable to the host computer, the method further including the steps of sending said quality characteristic to the host computer monitoring said quality characteristic within the host computer.

20. The method of claim 19, further including the steps of determining statistics regarding said quality characteristic and tracking performance of the printer based on said quality characteristic statistics within the host computer.

21. The method of claim 19 wherein said printer operating parameters are alterable to control said quality characteristic, the method further including the step of altering at least one of said printer operating parameters if said quality characteristic is below an unacceptable quality level.

22. The method of claim 15 wherein a user selects a print quality grade for said output image, the method further including the step of generating said output image to correspond to said user selected print quality grade.

23. The method of claim 22 wherein said print quality grade is an ANSI standard.

24. The method of claim 22 wherein said primer operating parameters are alterable to control said quality characteristic, the method further including the step of altering at least one of said printer operating parameters if said quality characteristic is not equal to said user selected print quality grade.

* * * * *

UNITED STATES PATENT AND TRADEMARK OFFICE
CERTIFICATE OF CORRECTION

PATENT NO. : 5,564,841
DATED : October 15, 1996
INVENTOR(S) : Pixie A. Austin and Duane M. Fox It is certified that error appears in the above-indentified patent and that said Letters Patent is hereby corrected as shown below:

In column 15, claim 15, line 41, please delete "primer" and insert therefor --printer--.

In column 16, claim 24, line 58, please delete "primer" and insert therefor --printer--.

Signed and Sealed this

Fourth Day of March, 1997

Attest:

BRUCE LEHMAN

*Attesting Officer*    *Commissioner of Patents and Trademarks*